(12) United States Patent
Wakita

(10) Patent No.: US 6,828,721 B2
(45) Date of Patent: Dec. 7, 2004

(54) DISPLAY AND DISPLAY PANEL USED IN THE SAME, AND FABRICATION METHOD THEREOF

(75) Inventor: Naohide Wakita, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/083,695

(22) Filed: Feb. 27, 2002

(65) Prior Publication Data
US 2002/0125815 A1 Sep. 12, 2002

(30) Foreign Application Priority Data
Feb. 27, 2001 (JP) .......................... 2001-052154

(51) Int. Cl.$^7$ .................................. H01J 1/62

(52) U.S. Cl. .................... 313/491; 313/495; 313/582; 313/586; 313/587; 313/634; 313/365; 349/60; 349/58

(58) Field of Search ................. 313/495, 582, 313/586, 587, 634, 635, 496, 497, 512, 317; 349/60, 58; 348/794, 836, 843

(56) References Cited

U.S. PATENT DOCUMENTS

| | | | | |
|---|---|---|---|---|
| 5,592,199 A | * | 1/1997 | Kawaguchi et al. | 345/206 |
| 6,175,396 B1 | * | 1/2001 | Kim et al. | 349/58 |
| 6,504,586 B1 | * | 1/2003 | Lee | 349/58 |
| 6,507,377 B1 | * | 1/2003 | Jung | 349/60 |
| 6,538,709 B1 | * | 3/2003 | Kurihara et al. | 349/58 |

FOREIGN PATENT DOCUMENTS

| | | |
|---|---|---|
| JP | 9-114393 | 5/1997 |
| JP | 2000-029005 | 1/2000 |
| JP | 2000-75805 | 3/2000 |
| JP | 2001-21884 | 1/2001 |
| JP | 2001-027752 | 1/2001 |

* cited by examiner

*Primary Examiner*—Vip Patel
*Assistant Examiner*—Holly Harer
(74) *Attorney, Agent, or Firm*—McDermott Will & Emery

(57) ABSTRACT

Disclosed is an image display comprising: a substrate including a light function layer for displaying an image by emitting or blocking light in accordance with a supplied voltage; and a frame body for surrounding the substrate, wherein a concave portion is provided on a side surface of the substrate, a convex portion is provided on an inner side of a side surface of the frame body, and the convex portion is fitted to the concave portion.

6 Claims, 18 Drawing Sheets

DISPLAY AND DISPLAY PANEL USED IN THE SAME, AND FABRICATION METHOD THEREOF

BACKGROUND OF THE INVENTION

1. Field of the Invention

The present invention relates to a display and a display panel used in the same. More particularly, the present invention relates to improvement of a structure for fixing the display panel to the display.

2. Description of the Related Art

Flat panel displays represented by liquid crystal displays, plasma displays, organic EL (Electro Luminescence) displays, and the like, use glass substrates comprising transparent electrodes made of indium tin oxide (ITO). Recently, image displays using plastic substrates instead of the glass substrates have been on the market, because the plastic substrates are lightweight, and further, can be thinned because they are not fragile.

A display panel is, together with a circuit board, a light guiding plate, or the like, installed in a casing. As shown in FIG. 19, when mounting a display panel 302 to a casing 301 as a support or another components, relative position of the panel 302 with respect to these components is first determined and then the panel 302 is fixed thereto. For instance, in a procedure, there is provided a frame 304 in the casing for surrounding the panel 302, into which the panel 302 is fitted, thus positioning the panel 302, which is thereafter fixed to the casing 301 by means of suitable means.

In case of the panel using the glass substrates, as shown in FIG. 19, an adhesive double coated tape 303 has been used for fixing the panel 302. This fixing method takes some trouble in attaching the tape 303 to the casing 301 or the like. Besides, in a case where the display panel using the plastic substrates is fixed by means of the adhesive double coated tape, when the panel is detached for the purpose of correction of its position or the like, after fixed, it might be plastically deformed by a stress applied to the plastic substrate.

SUMMARY OF THE INVENTION

The present invention has been made to solve the above-mentioned problem, and an object of the present invention is to provide an image display in which a display panel is capable of being easily positioned, and the display panel.

Another object of the present invention is to provide an image display in which a display panel is capable of being removably and easily fixed, and the display panel.

To achieve the above-described objects, there is provided an image display comprising: a substrate including a light function layer for displaying an image by emitting or blocking light in accordance with a supplied voltage; and a frame body for surrounding the substrate, wherein a concave portion or a convex portion is provided on a side surface of the substrate, the convex portion or the concave portion is provided on an inner side of a side surface of the frame body, and the convex portion is fitted to the concave portion. With this constitution, the substrate having the light function layer, and hence the display panel, can be easily positioned in the direction parallel to the surface of the substrate.

The convex portion or the concave portion may be comprised of an elastic body.

Also, a pressing force by the elastic body may act between convex portion and the concave portion in the direction parallel to the substrate. With this constitution, by suitably selecting the elastic force, the substrate can be fixed to the frame body by the friction force between the convex portion and the concave portion.

The elastic body may be comprised of a spring.

The spring may be comprised of a plate spring.

The elastic body may be comprised of a cushion.

The cushion may be made of rubber.

The substrate may be fixed to the frame body by a friction force generated between the convex portion and the concave portion in the direction perpendicular to the surface of the substrate. With this constitution, the display panel can be removably and easily fixed to the frame body.

The frame body may be of a rectangular-ring shape or of a U-shape.

According to the present invention, there is also provided an image display comprising: a substrate including a light function layer for displaying an image by emitting or blocking light in accordance with a supplied voltage; and a base on which the substrate is placed, wherein a concave portion is provided on a lower surface of the substrate, a convex portion is provided on an upper surface of the base, and the convex portion is fitted to the concave portion. With this constitution, the substrate having the light function layer, and hence the display panel, can be easily positioned in the direction parallel to the substrate.

The concave portion may extend from the base toward the substrate and the convex portion is column-shaped such that it extends from the base toward the substrate, the concave portion may have a small cross-sectional area portion and a large cross-sectional area portion along a plane orthogonal to a direction from the base toward the substrate on the base side and on the substrate side, respectively, the convex portion may have a small cross-sectional area portion and a large cross-sectional area portion along a plane orthogonal to the direction from the base toward the substrate on the base side and on the substrate side, respectively, and the large cross-sectional area portion of the convex portion may be fitted to the large cross-sectional area portion of the concave portion and the large cross-sectional area portion of the convex portion may be engaged with the small cross-sectional area portion of the concave portion. With this constitution, the display panel can be removably and easily fixed to the base.

According to the present invention, there is further provided an image display comprising: a substrate including a light function layer for displaying an image by emitting or blocking light in accordance with a supplied voltage; and a base on which the substrate is placed, wherein a convex portion is provided on a lower surface of the substrate, a concave portion is provided on an upper surface of the base, and the convex portion is fitted to the concave portion. With this constitution, the substrate having the light function layer, and hence the display panel, can be easily positioned in the direction parallel to the substrate.

The concave portion may extend from the substrate toward the base and the convex portion is column-shaped such that it extends from the substrate toward the base, the concave portion may have a small cross-sectional area portion and a large cross-sectional area portion along a plane orthogonal to a direction from the substrate toward the base on the substrate side and the on the base side, respectively, the convex portion may have a small cross-sectional area portion and a large cross-sectional area portion along a plane orthogonal to a direction from the substrate toward the base, on the substrate side and on the base side, respectively, and the large cross-sectional area portion of the convex portion may be fitted to the large cross-sectional area concave portion and the large cross-sectional area portion of the convex portion may be engaged with the small cross-sectional area portion of the concave portion. With this constitution, the display panel can be removably and easily fixed to the base.

Still further, there is provided an image display comprising: a substrate including a light function layer for displaying an image by emitting or blocking light in accordance with a supplied voltage; and a base on which the substrate is placed, wherein the substrate is fixed to the base by means of a screw. With this constitution, the substrate having the light function layer, and hence the display panel, can be removably and easily fixed to the base.

The light function layer may be a liquid crystal layer and the base is a light guiding plate for guiding light from a light source toward the liquid crystal layer. Thereby, the fixing structure of the display panel can be simplified.

The substrate may be made of resin.

Also, a plurality of convex portion and a plurality of concave portions may be provided.

The light function layer may be made of an inorganic fluorescent material, an organic fluorescent material, or liquid crystal. In the plasma display, an applied voltage causes a gas to be excited to thereby emit ultraviolet rays, which collide with the organic fluorescent material, thereby emitting light. Also, in the organic EL device, the voltage is applied to the organic fluorescent material to thereby emit light. Accordingly, by making the light function layer of the inorganic fluorescent material, the organic fluorescent material, or liquid crystal, the present invention is applicable to the plasma display, the organic EL device, and the liquid crystal display.

Also, there is provided an image display comprising: a substrate including a light function layer for displaying an image by emitting or blocking light in accordance with a supplied voltage; and a frame body for surrounding the substrate, wherein the substrate is fixed to the frame body by a friction force generated between them. With this constitution, the substrate having the light function layer, and hence the display panel, can be removably fixed to the frame body.

Further, there is provided an image display comprising: a substrate including a light function layer for displaying an image by emitting or blocking light in accordance with a supplied voltage; and a circuit board provided with a drive circuit for supplying the voltage to the light function layer, wherein the circuit board is fixed at both ends to different main surfaces of the substrate. With this constitution, since the both ends of the flexible circuit board are fixed to the substrate, the need for members in addition to the display panel for the purpose of fixing the ends of the flexible circuit board is eliminated. Therefore, a compact image display is attained.

In the image display, one end of the circuit board may be fixed to a surface of the substrate having the light function layer, a fixing pin may be provided on a surface of the substrate on the opposite side of the surface on which the light function layer is provided, the circuit board may be provided with a concave portion or a through hole, and part of the circuit board may be fixed to the surface of the substrate on the opposite side of the surface on which the light function layer is provided by engagement of the fixing pin with the concave portion or the through hole. With this constitution, the circuit board can be easily fixed to the surface of the substrate on the opposite side of the surface on which the light function layer is provided.

Also, one end of the circuit board may be fixed to a surface of the substrate having the light function layer, a concave portion or a through hole may be provided on a surface of the substrate on the opposite side of the surface on which the light function layer is provided, a fixing pin may be provided on the circuit board, and part of the circuit board may be fixed to the surface of the substrate on the opposite side of the surface on which the light function layer is provided by engagement of the fixing pin with the concave portion or the through hole.

Moreover, there is provided a display panel comprising: a substrate including a light function layer for displaying an image by emitting or blocking light in accordance with a supplied voltage, wherein a concave portion is provided on a side surface of the substrate. Thereby, by providing the convex portion on the inner side of the side surface of frame body for surrounding the substrate, the display panel can be positioned easily in the direction parallel to the surface of the substrate.

The above and further objects and features of the invention will more fully be apparent from the following detailed description with accompanying drawings.

DETAILED DESCRIPTION OF THE PREFERRED EMBODIMENTS

Hereinafter, preferred embodiments of the present invention will be described with reference to accompanying drawings.

First Embodiment

A first embodiment illustrates a case where a display panel is fixed by fitting.

Figure 1:
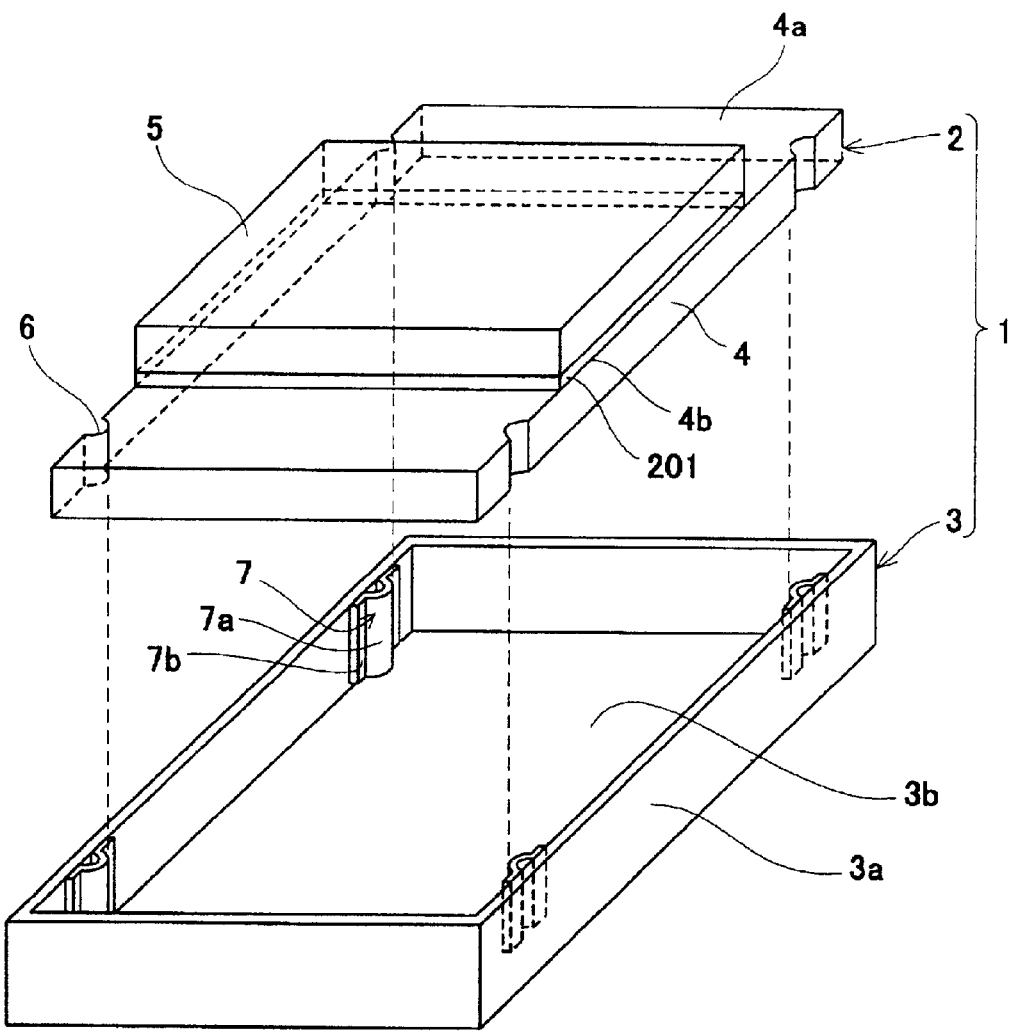
FIG. 1 is an exploded perspective view showing a schematic constitution of an image display according to a first embodiment of the present invention.
Figure 2:
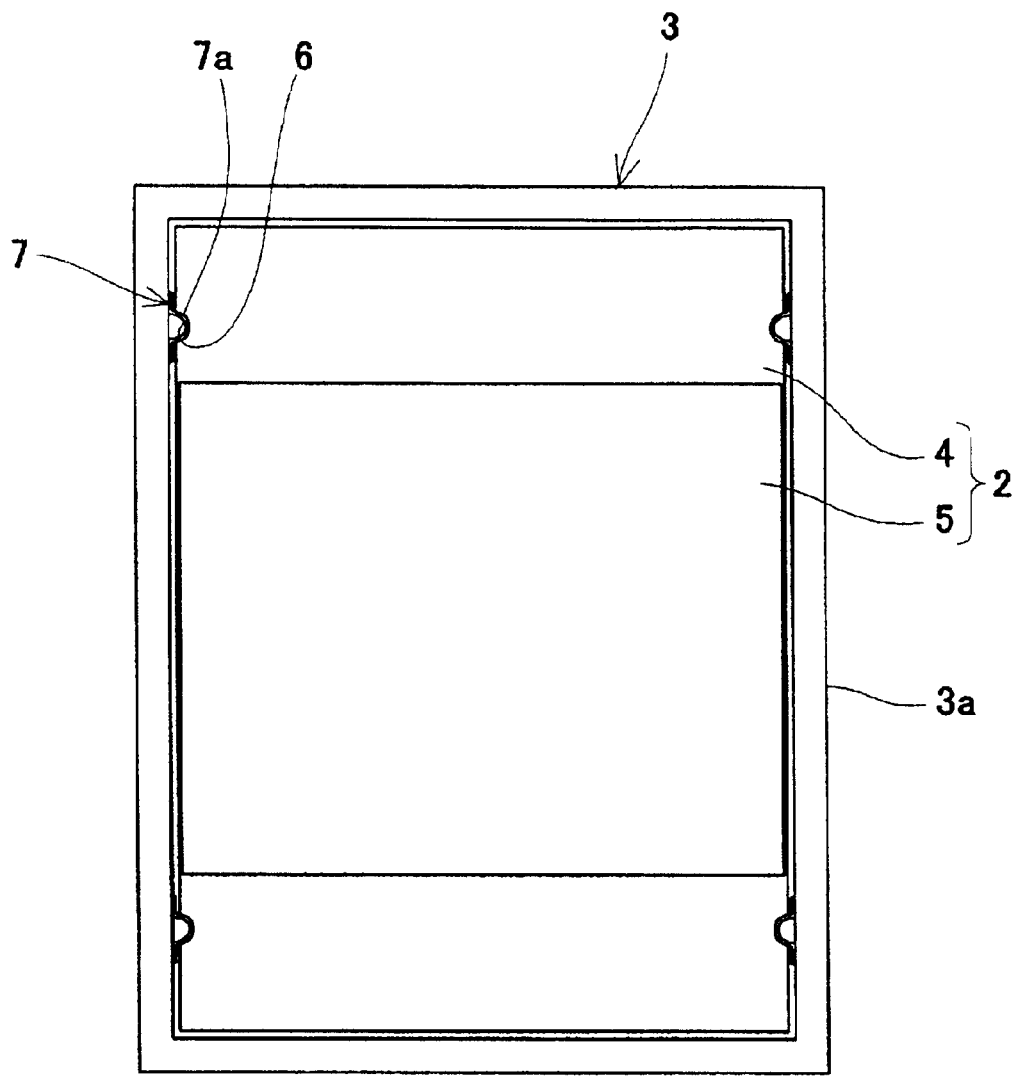
FIG. 2 is a plan view showing the schematic constitution of the image display according to the first embodiment.

FIG. 1 is an exploded perspective view schematically showing an image display according to this embodiment and FIG. 2 is a plan view thereof.

Referring now to FIGS. 1–2, an image display 1 of this embodiment is a liquid crystal display. This liquid crystal display is, e.g., a reflective liquid crystal display including no illuminating device for supplying display light.

The image display 1 comprises a display panel 2 comprised of a liquid crystal panel and a casing 3. The display panel 2 is constituted such that an array substrate 4 and an opposing substrate 5 are disposed as opposed to each other with a minute gap therebetween and liquid crystal 201 is filled and sealed between these substrates. The array substrate 4 is, e.g., comprised of a transparent plastic substrate. The array substrate 4 is rectangular and has a display region 4b at a predetermined region (central region) in an inner surface thereof. In this display region 4b, pixel electrodes (also serving as a reflective film) comprised of an ITO, and image signal lines, scanning signal lines, switching devices (not shown) and so forth, as desired, are provided. Further, in a region other than the display region 4a (hereinafter expressed as a non-display region) in the inner surface of the array substrate 4, an LSI (not illustrated herein and hereinafter expressed as a drive LSI) including a drive circuit for driving the pixel electrodes, the switching devices, or the like, and a control circuit therefor, are provided. The opposing substrate 5 is rectangular so as to conform in shape to the display region 4b of the array substrate 4 and provided with counter electrodes (not shown) over substantially the entire region in the inner surface thereof. The opposing substrate 5 is disposed as opposed to the display region 4b of the array substrate 4. In such constitution, a voltage according to a video signal output from the drive LSI, is applied across the pixel electrode and the counter electrode, and in accordance with the applied voltage, the liquid crystal 201 is modulated. Then, according to the degree of modulation of the liquid crystal 201, transmittance of the display light (e.g., ambient light) from a light source varies, thereby displaying an image according to the video signal on the display panel 2. In brief, the array substrate 4 and the opposing substrate 5 constitute a display portion of the display 1.

The array substrate 4 is provided with a plurality of (e.g., four) fitting concave portions to be fitted to the casing 3 at portions of an outer periphery (end faces) thereof, corresponding to the non-display region 4a. The fitting concave portions are comprised of semi-cylindrical grooves 6 formed over the whole thickness of the array substrate 4. The groves 6 are formed when the individual array substrates 4 are cut out from a large-sized sheet provided with patterns of a plurality of array substrates 4 by using a laser or the like. The casing 3 is, e.g., made of plastic and is of a box shape having a rectangular planar shape. The casing 3 constitutes not only a body of the image display 1 but also a panel fixing member to which the display panel 2 is to be fixed. The casing 3 is shaped so as to accommodate the display panel 2. More specifically, as is apparent from FIG. 2, the casing 3 has a planar shape so as to have a slight clearance between a side portion (frame body) 3a of the casing 3 and the accommodated display panel 2 and a depth slightly larger than the thickness of the display panel 2. Also, a plurality of (e.g., four) fitting convex portions to be fitted to the array substrate 4 are provided on the inner surface of the side portion 3a of the casing 3. The fitting convex portions are comprised of plate springs structured such that central portions 7a are semi-cylindrically protruded and opposite end portions 7b as rectangular flat plates. The plate springs 7 are provided at positions of the side portion 3a of the casing 3, corresponding to the grooves 6 of the array substrate 4. The axial direction of the semi-cylindrical central portions 7a corresponds with the depth direction of the casing 3. The opposite end portions 7b are fixed to the side portion 3a by means of suitable means such as screws, bond or the like. The semi-cylindrical portions 7a are of a size so as to be slightly recessed when fitted to the grooves 6 of the array substrate 4.

Subsequently, how the display panel 2 of the above-constituted display 1 is attached/detached to/from the casing 3 will be explained.

When attaching the display panel 2 to the casing 3, the display panel 2 is inserted into the casing 3 while moving the display panel 2 along the depth direction of the casing 3 as shown in FIG. 1. In this case, the display panel 2 is pushed thereinto until the array substrate 4 makes contact with a bottom portion 3b of the casing 3. Thereby, the display panel 2 is positioned in the thickness direction of thereof. Simultaneously, the grooves 6 of the array substrate 4 of the display panel 3 are fitted to the central portions 7a of the plate springs 7, and the central portions 7a are slightly recessed by elastic deformation. Then, the plate springs 7 press the grooves 6 by a restoration force as the result of the plastic deformation, thereby generating a friction force between the surfaces of the grooves 6 and surfaces of the central portions 7a of the plate springs 7. With the friction force, the array substrate 4 is fixed to the casing 3. Besides, the pressing force positions the display panel 2 in the direction perpendicular to thickness direction.

On the other hand, when detaching the display panel 2 from the casing 3, the casing 3 is suitably fixed and then the display panel 2 is pulled by a force exceeding a resistive force due to the friction force. Thereby, the display panel 2 is detached from the casing 3.

It should be noted that the convex portions may be plastically deformed provided that the friction force is generated when the display panel 3 is detached from the casing 3. Nevertheless, it is preferable that the convex portions are elastically deformed in view of easiness of fitting/disengaging of the convex portions to/from the concave portions.

As should be understood, in this embodiment, the display panel 2 can be easily positioned in the direction perpendicular to the thickness direction and fixed to the casing 3. In addition, the display panel 2 can be removably fixed with ease. As a consequence, a display panel fixing structure suitable for use in the image display using the plastic substrate is provided.

Figure 3:
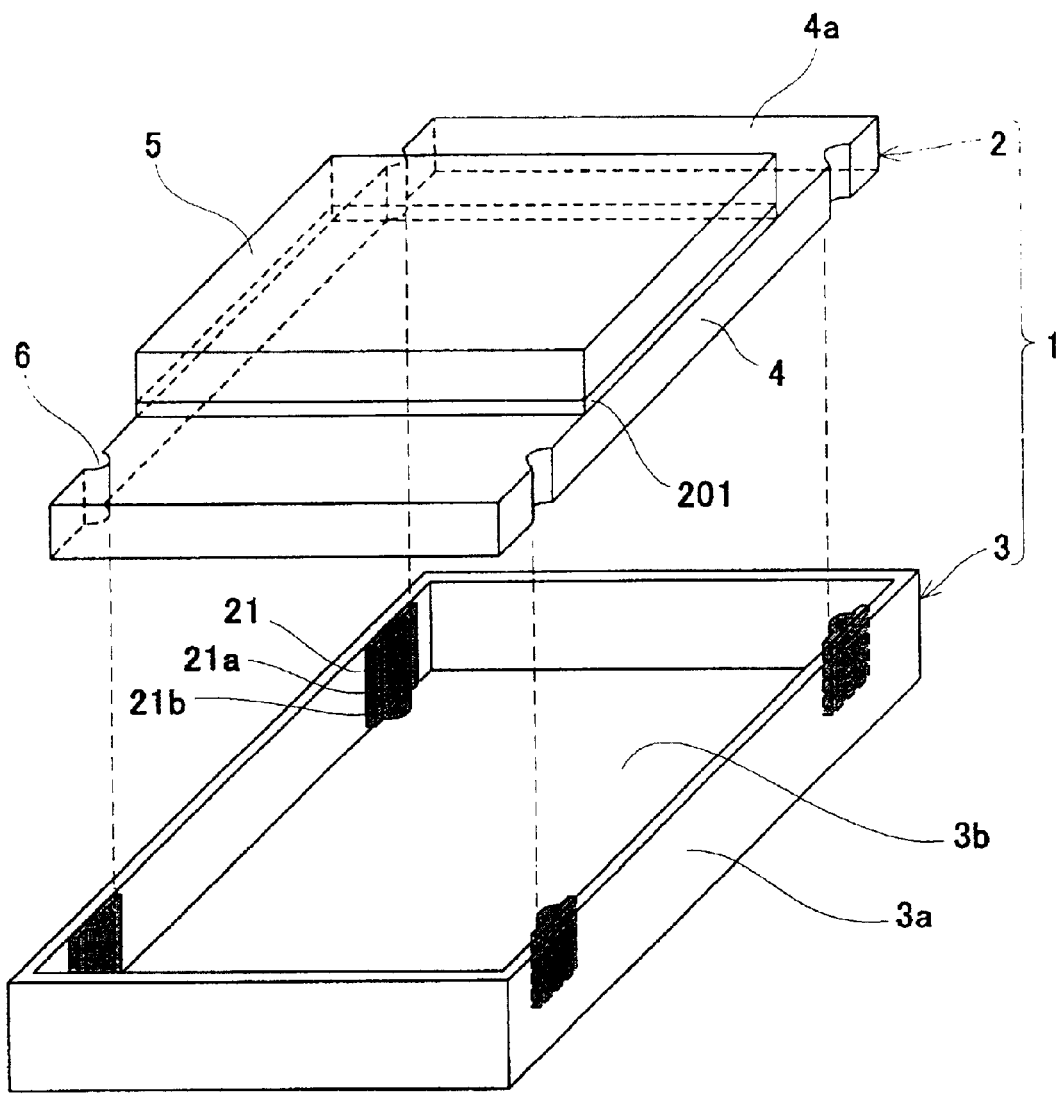
FIG. 3 is an exploded perspective view showing a schematic constitution of a first modification of the first embodiment.

Subsequently, a modification of this embodiment will be described. FIG. 3 is an exploded perspective view showing a schematic constitution of the first modification. As shown in FIG. 3, as the fitting convex portions of this modification, cushion members 21 are used instead of the plate springs 7 of FIG. 1. The cushion members 21 are made of a material that is elastically-deformable in volume, e.g., rubber. The cushion members 21 have semi-cylindrical central portions 21a and opposite end portions 21b comprised of rectangular flat plates. The cushion members 21 are disposed such that axes of the semi-cylindrical central portions 21a correspond with the depth direction of the casing 3. The central portions 21a are of a size so as to be slightly compressible when fitted to the grooves 6 of the array substrate 4. When the cushion members 21 are fitted to the grooves 6, the central portions 21a press the grooves 6 by a restoration force as the result of the compression of the central portions 21a. Thereby, the same effects provided by the constitution of FIG. 1 are attained.

Figure 4:
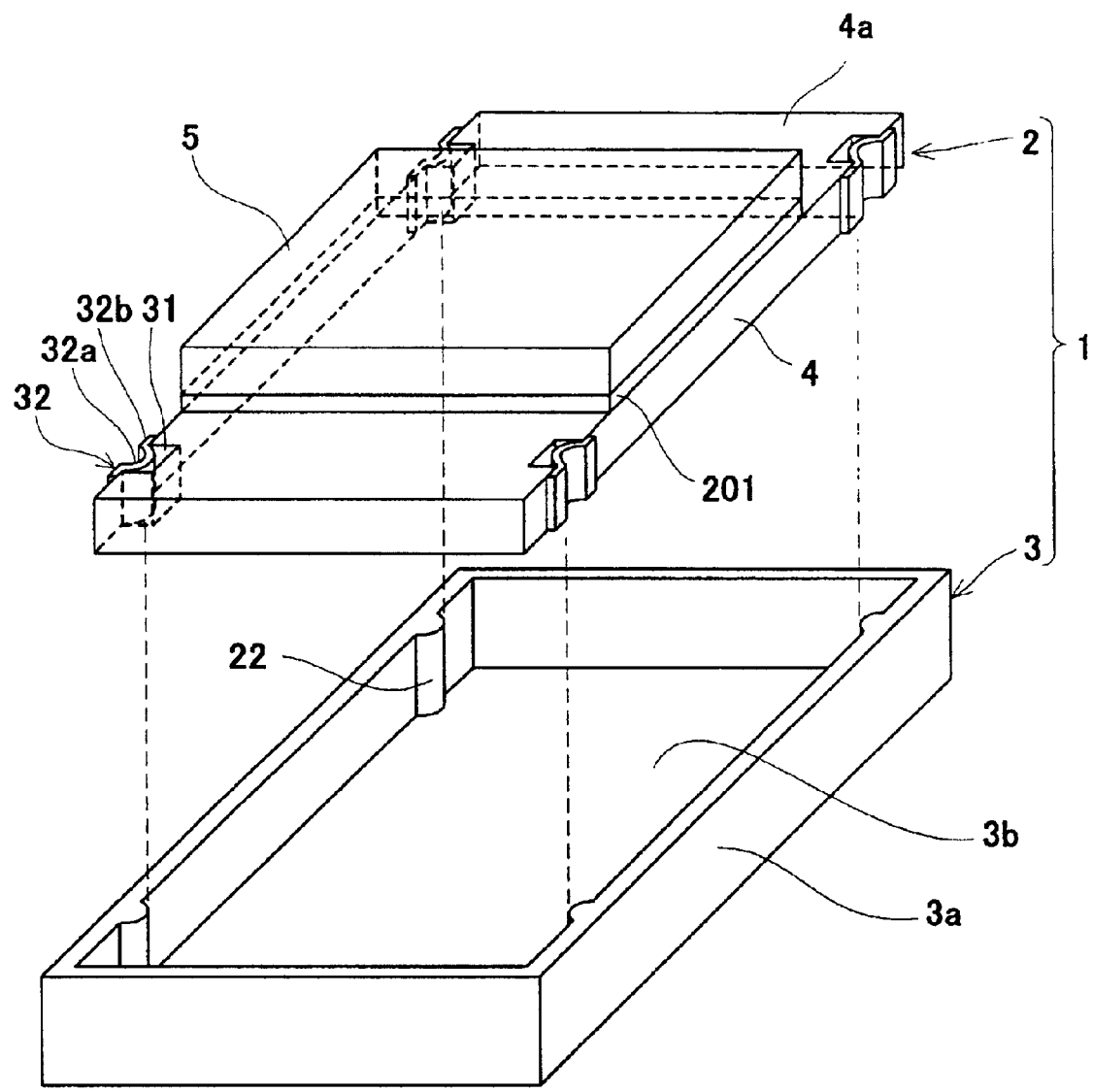
FIG. 4 is an exploded perspective view showing a schematic constitution of a second modification of the first embodiment.

FIG. 4 is an exploded perspective view showing a schematic constitution of a second modification of this embodiment. As shown in FIG. 4, the fitting concave portions of the array substrate 4 are comprised of plate springs 32. The plate springs 32 and the plate springs 7 of FIG. 1 are reversed in shape and central portions 32a of the plate springs 32 are semi-cylindrically recessed. The array substrate 4 is provided with tubular concave portions 31 with rectangular cross section into which the central portions 32a are accommodated with a clearance between them. Meanwhile, fitting convex portions of the casing 3 are comprised of semi-cylindrical protrusions 22 extending over the whole height of the side portions 3a of the casing 3. The fitting relation between the protrusions 22 and the plate springs 32 is similar to that of FIG. 1, and with this relation, the same effects provided by the constitution of FIG. 1 are obtained.

Figure 5:
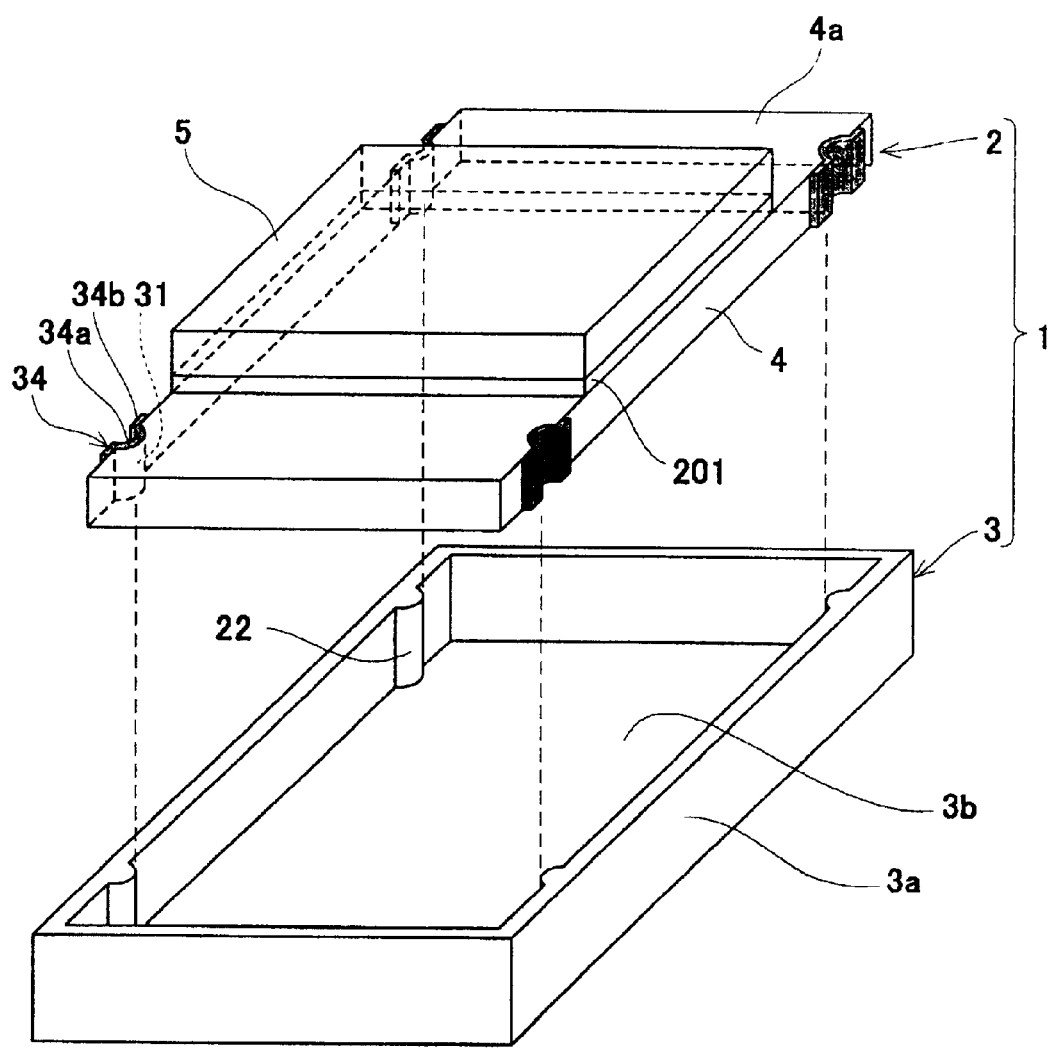
FIG. 5 is an exploded perspective view showing a schematic constitution of a third modification of the first embodiment.

FIG. 5 is an exploded perspective view showing a schematic constitution of a third modification of this embodiment. In this modification, the fitting concave portions of the array substrate 4 are comprised of cushion members 34. The cushion members 34 are made of the material of the cushion members 21 of the first modification and shaped similarly to the plate springs 32 of the second modification. The fitting relation between the protrusions 22 and the cushion members 35 is similar to that of the first modification, and with this relation, the same effects provided by the constitution of the first modification are obtained.

Figure 6:
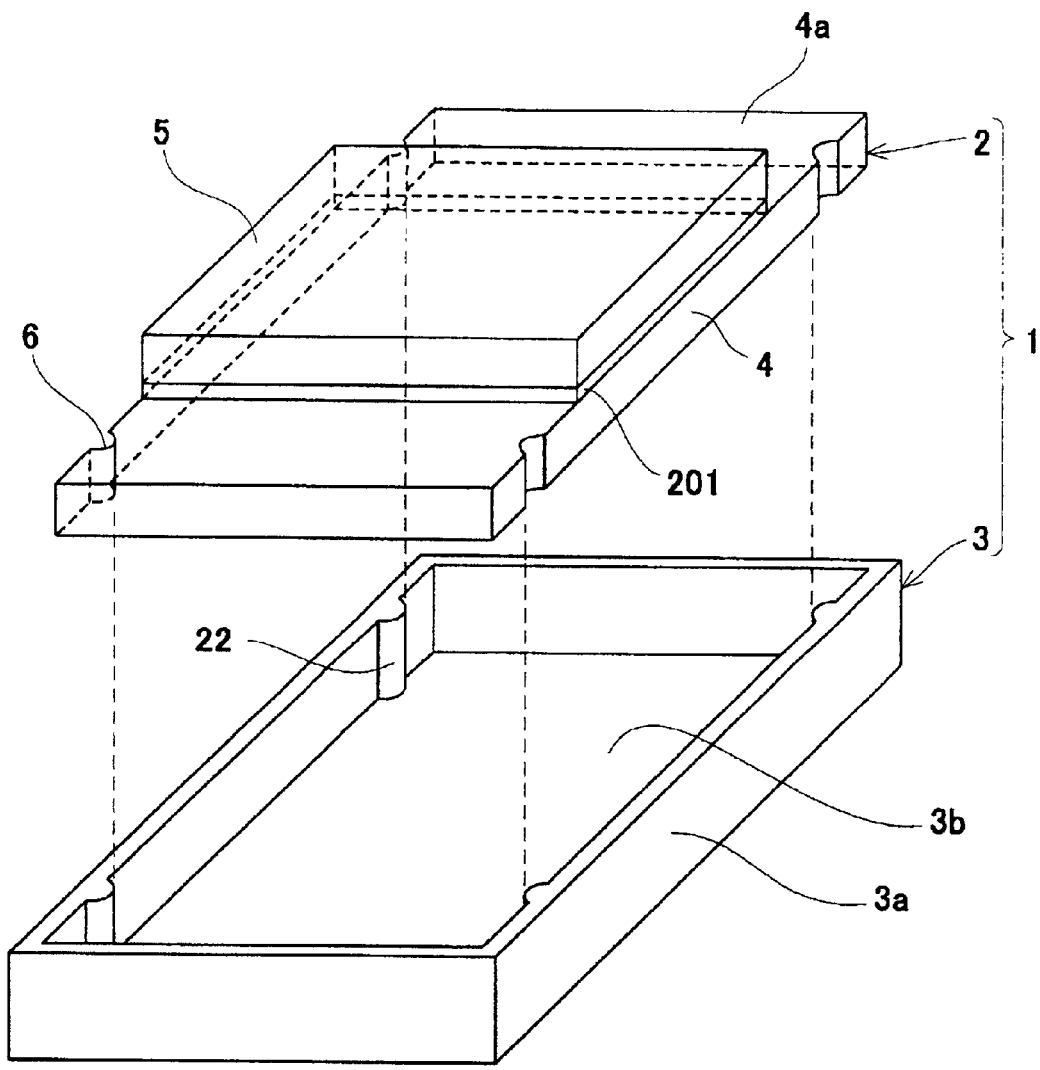
FIG. 6 is an exploded perspective view showing a schematic constitution of a fourth modification of the first embodiment.

FIG. 6 is an exploded perspective view showing a schematic constitution of a fourth modification of this embodiment. As shown in FIG. 6, in this modification, fitting concave portions of the array substrate 4 correspond to the grooves 6 of FIG. 1 and fitting convex portions of the casing 3 correspond to the protrusions 22 of the second modification. The protrusions 22 are pressed into the grooves 6. This is accomplished by the constitution in which a diameter of cross sections of the protrusions 22 is slightly larger than that of the grooves 6 and gradually increased from an opening of the casing 3 to the bottom portion 3b. With this constitution, when the display panel 2 is inserted into the casing 3, the protrusions 22 of the casing 3 are pressed into the grooves 6, thereby causing a friction force between the protrusions 22 and the grooves 6. With this friction force, the array substrate 4 and hence, the display panel 2 are fixed to the casing 3. Also, this pressing positions the display panel 2 in the direction perpendicular to the thickness direction. Consequently, also in this modification, the display panel 2 can be easily positioned in the direction perpendicular to the thickness direction and fixed to the casing 3.

Figure 7:
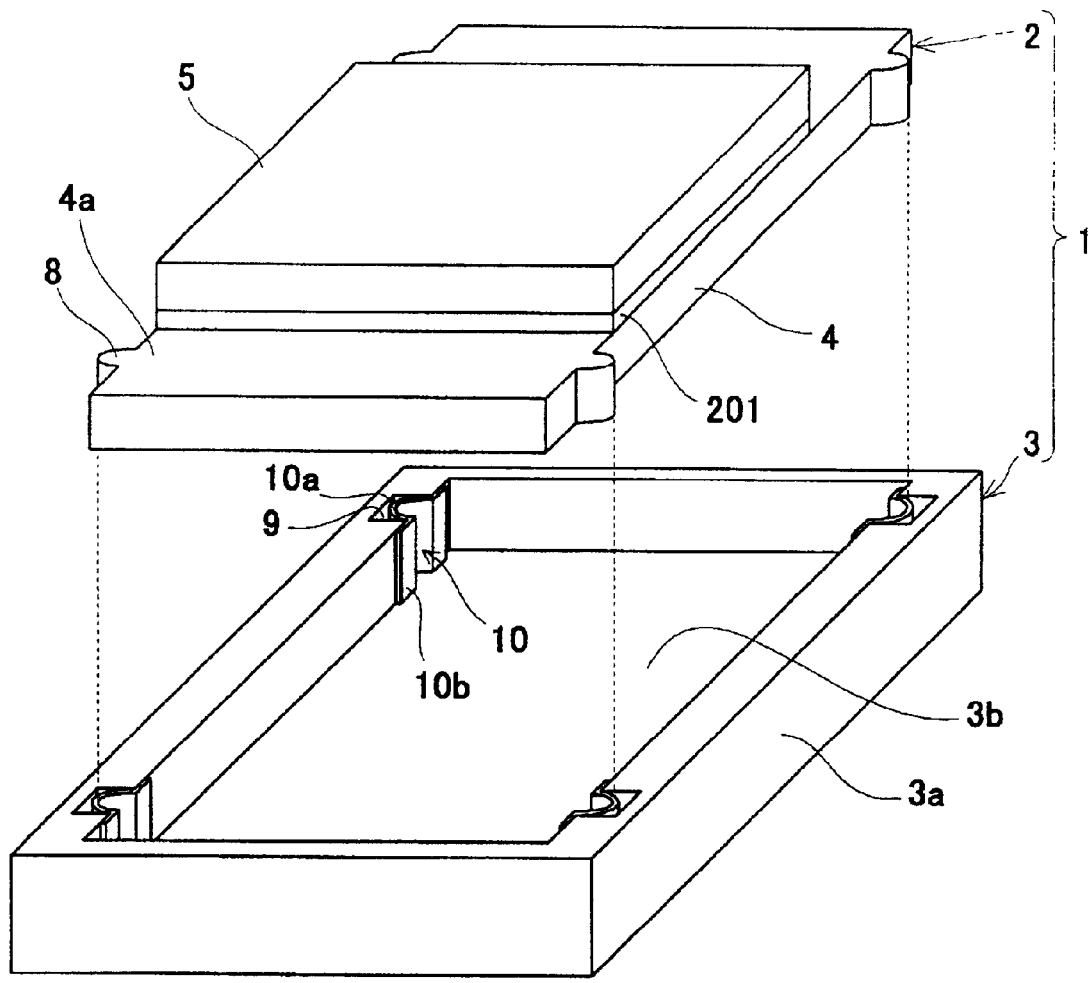
FIG. 7 is an exploded perspective view showing a schematic constitution of a fifth modification of the first embodiment.

FIG. 7 is an exploded perspective view showing a schematic constitution of a fifth modification of this embodiment. As shown in FIG. 7, in this modification, the array substrate 4 is provided with fitting convex portions and the casing 3 is provided with fitting concave portions. The fitting convex portion of the array substrate 4 are comprised of semi-cylindrical protrusions 8 extending over the whole thickness and the fitting concave portions of the casing 3 are comprised of plate springs 10 having a shape similar to that of the plate springs 32 of the second modification. The side portion 3a of the casing 3 is provided with tubular concave portion 9 with rectangular cross section for accommodating the plate spring 10. The concave portion 9 is formed similarly to the concave portion 31 of the second modification. The fitting relation between the protrusions 8 and the plate springs 10 is similar to that of the second modification, and with this relation, the same effects provided by the constitution of the first modification are attained.

Figure 8:
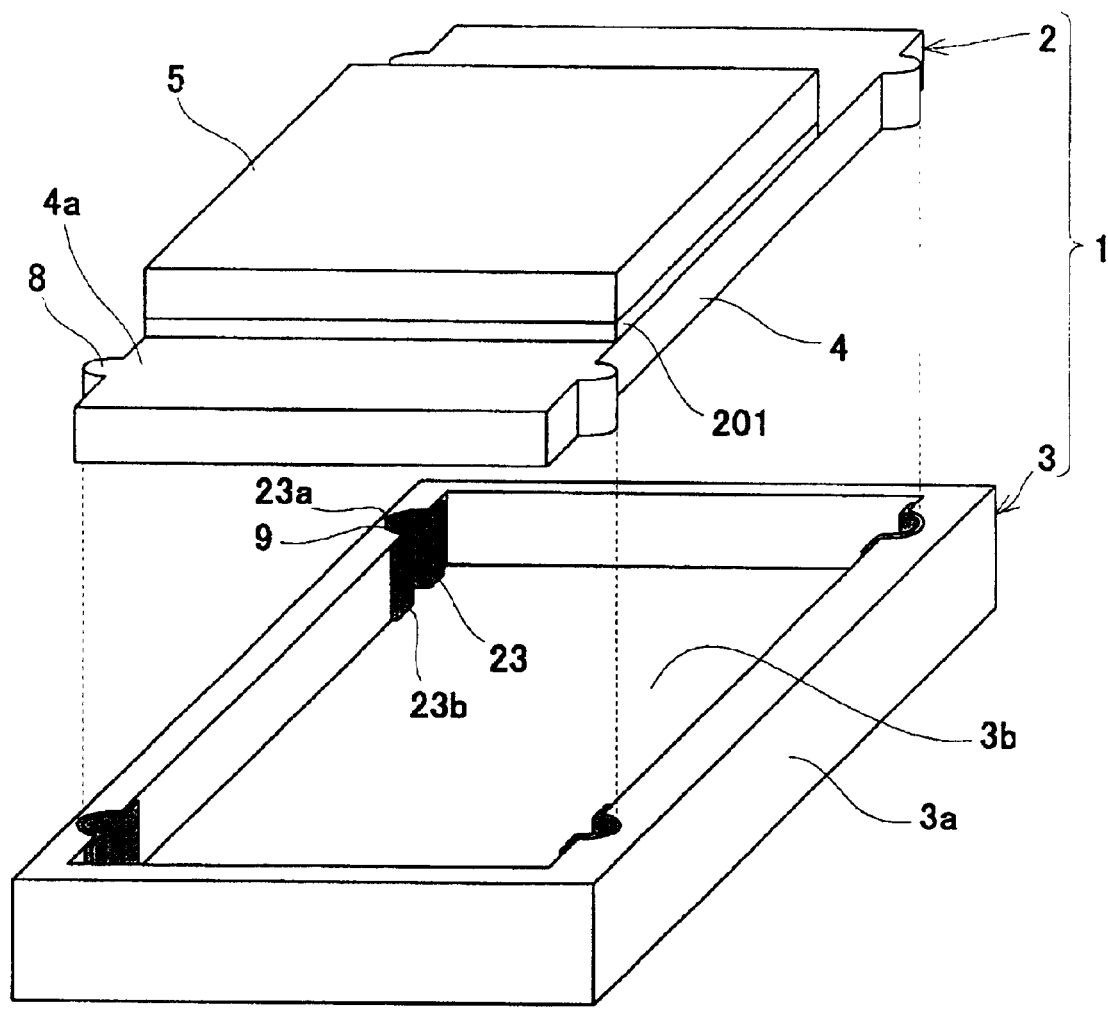
FIG. 8 is an exploded perspective view showing a schematic constitution of a sixth modification of the first embodiment.

FIG. 8 is an exploded perspective view showing a schematic constitution of a sixth modification of this embodiment. As shown in FIG. 8, as the fitting concave portions of this modification, cushion members 23 are used instead of the plate springs 10 of the fifth modification. The cushion members 23 are made of a material similar to that of the cushion member 34 of the third modification and shaped similarly to the plate springs 10 of the fifth modification. The fitting relation between the protrusions 8 of the array substrate 4 and the cushion members 23 is similar to that of the fifth modification, and with this relation, the same effects provided by the constitution of the fifth modification are obtained.

Figure 9:
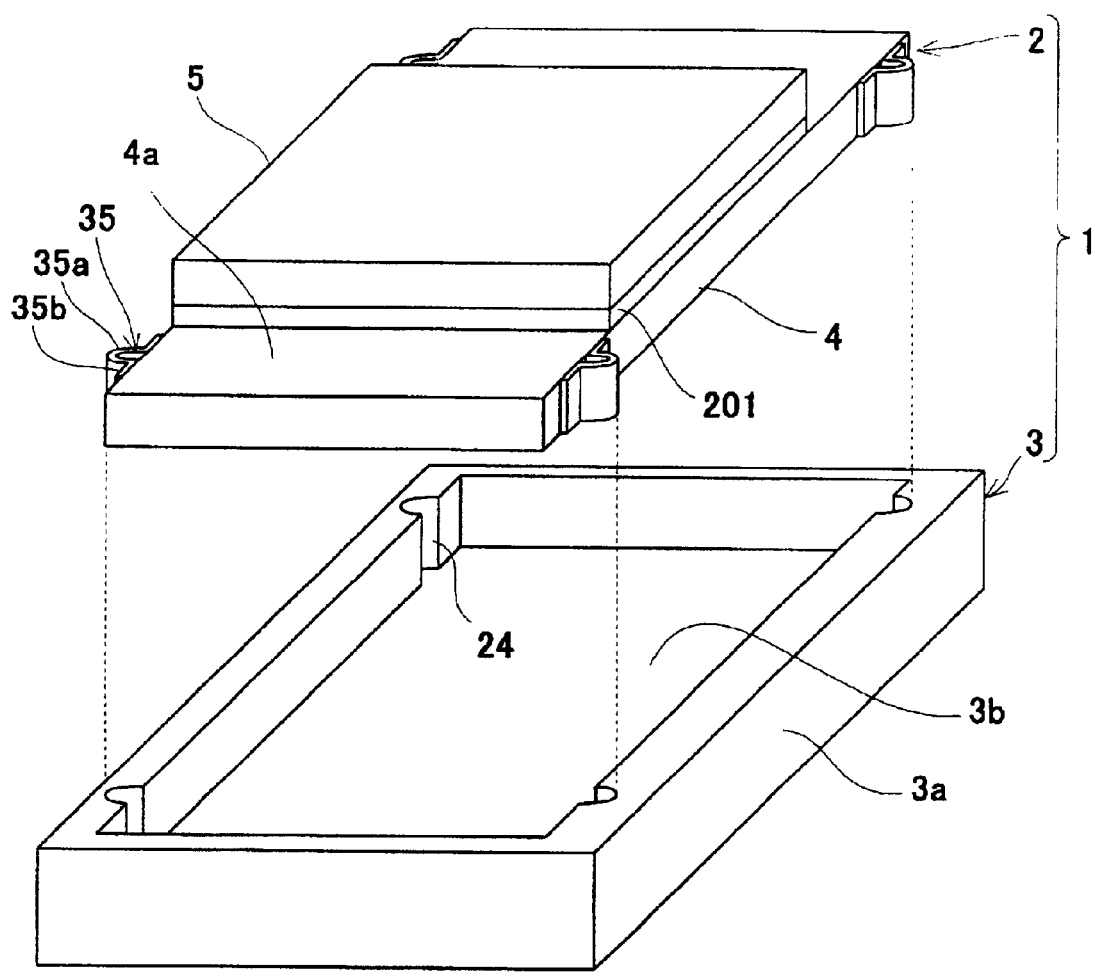
FIG. 9 is an exploded perspective view showing a schematic constitution of a seventh modification of the first embodiment.

FIG. 9 is an exploded perspective view showing a schematic constitution of a seventh modification of this embodiment. As shown in FIG. 9, in this modification, the fitting convex portions of the array substrate 4 are comprised of plate springs 35. The plate springs 35 are shaped similarly to the plate springs 7 of FIG. 7. The fitting concave portions of the casing 3 are comprised of semi-cylindrical grooves 24 extending over the entire height of the side portions 3a of the casing 3. The fitting relation between the grooves 24 and the plate springs 35 are similar to those of the constitution of FIG. 1 and the same effects provided by the constitution of FIG. 1 are attained.

Figure 10:
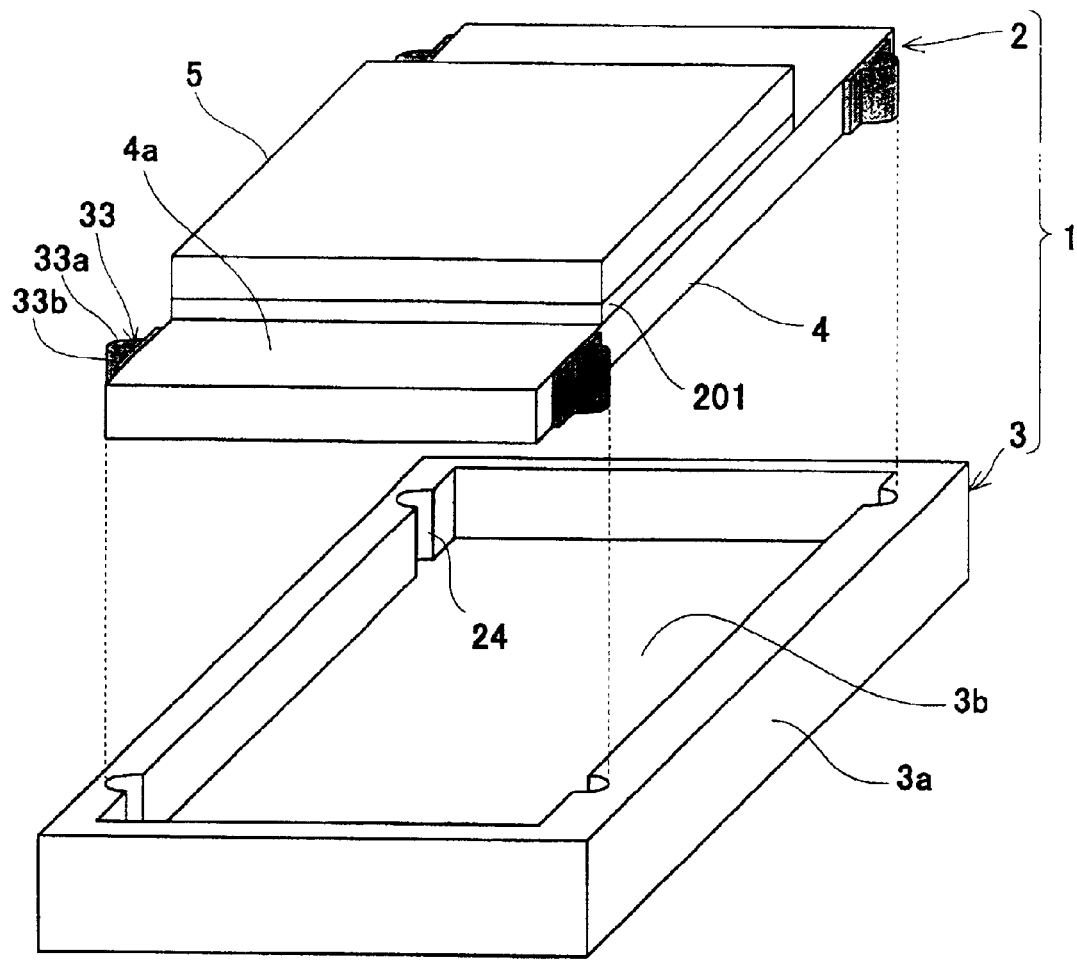
FIG. 10 is an exploded perspective view showing a schematic constitution of an eighth modification of the first embodiment.

FIG. 10 is an exploded perspective view showing a schematic constitution of an eighth modification of this embodiment. As shown in FIG. 10, in this modification, fitting convex portions of the array substrate 4 are comprised of cushion members 33. The cushion members 33 are made of a material similar to that of the cushion members 21 of the first modification and shaped similarly to the cushion members 21. The fitting relation between protrusions 8 of the casing 3 and the cushion members 33 are similar to that of the modification of FIG. 1 and the same effects provided by the first modification can be attained.

Figure 11:
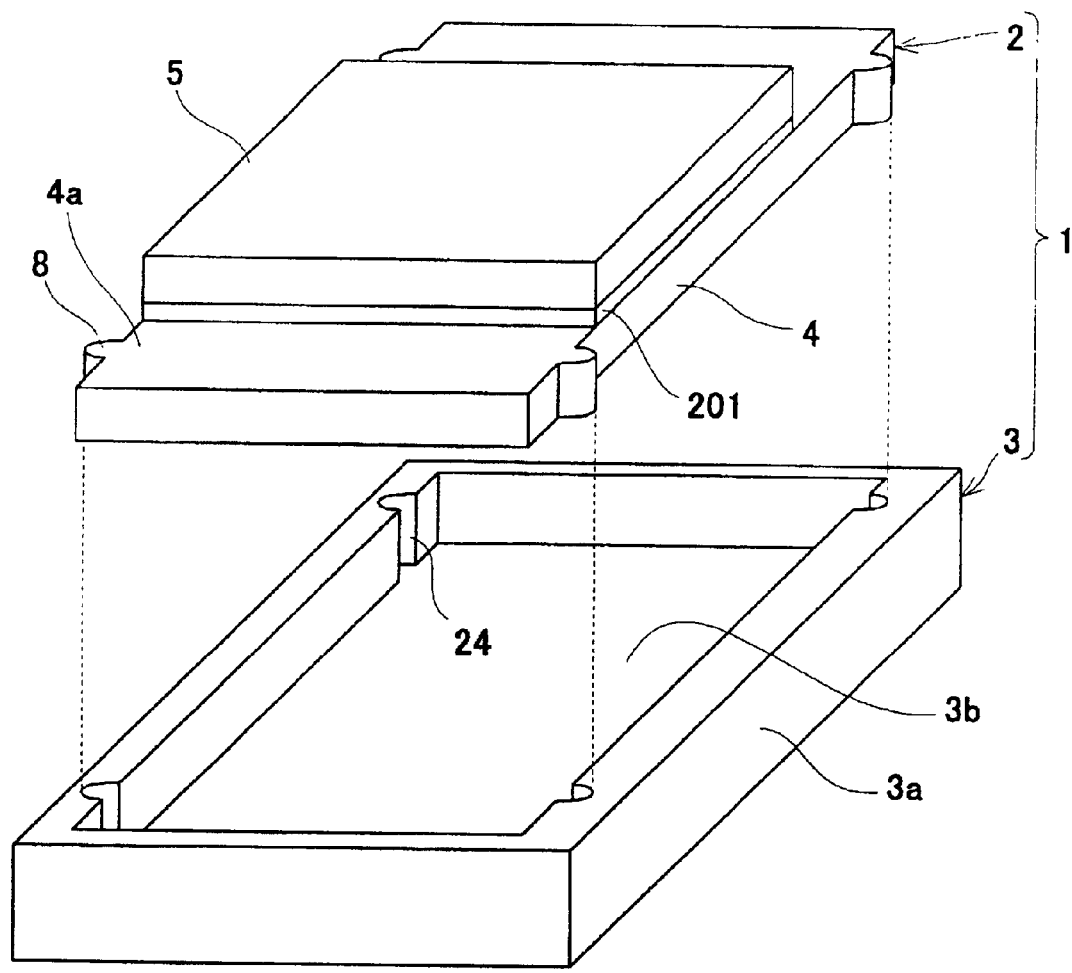
FIG. 11 is an exploded perspective view showing a schematic constitution of a ninth modification of the first embodiment.

FIG. 11 is an exploded perspective view showing a schematic constitution of a ninth modification of this embodiment. Referring to FIG. 11, fitting convex portions of the array substrate 4 are comprised of the protrusions 8 of the fifth modification and the fitting concave portions of the casing 3 are comprised of the grooves 24 of the seventh modification. The protrusions 8 can be pressed into the grooves 24. The dimensional relationship in pressing between the protrusion 8 and the groove 24 is equal to that of the fourth modification and the same effects provided by the fourth modification can be provided.

As should be understood from the foregoing description, in the present invention, "fitting" includes fitting of the fitting portion with slight elastic deformation and plastic deformation (fourth and ninth modifications).

In the above-mentioned constitutions, although there are provided a plurality of fitting portions at the array substrate 4 and the casing 3, one fitting portion is satisfactory. In that case, a side of the array substrate 4 which is opposed to the side of the array substrate 4 on which the fitting portion is provided is in contact with the casing 3.

Also, in the above-mentioned constitutions, the fitting convex portions and the fitting concave portions are provided for the purpose of fitting between the display panel 2 and the casing 3. Alternatively, one of the display panel 2 and the casing 3 may be provided with convex portions similar to the fitting convex portions of the above constitutions, and the corresponding portion of the other may be flat. In that case, it is desirable to provide the convex portions at sides of one of the display panel 2 and the casing 3 that are orthogonal to each other seen in a plan view. With this constitution, the friction force generated by contact between the convex portions of one of the display panel 2 and the casing 3 and the other can fix the display panel 2 to the casing 3 and position the display panel 2 in the direction perpendicular to the thickness direction thereof.

Further, while the fitting portions are provided on the non-display region 4a of the array substrate 4, they may be provided on the display region 4b. Moreover, the fitting portions may be provided on the opposing substrate 5.

The array substrate 4 may be made of glass instead of the above-mentioned plastic. However, plastic can be processed more easily than glass, and hence, the array substrate 4 having the convex/concave portions on the side surface can be fabricated from plastic more easily rather than glass. In view of this, the array substrate 4 is preferably made of plastic.

Figure 18:
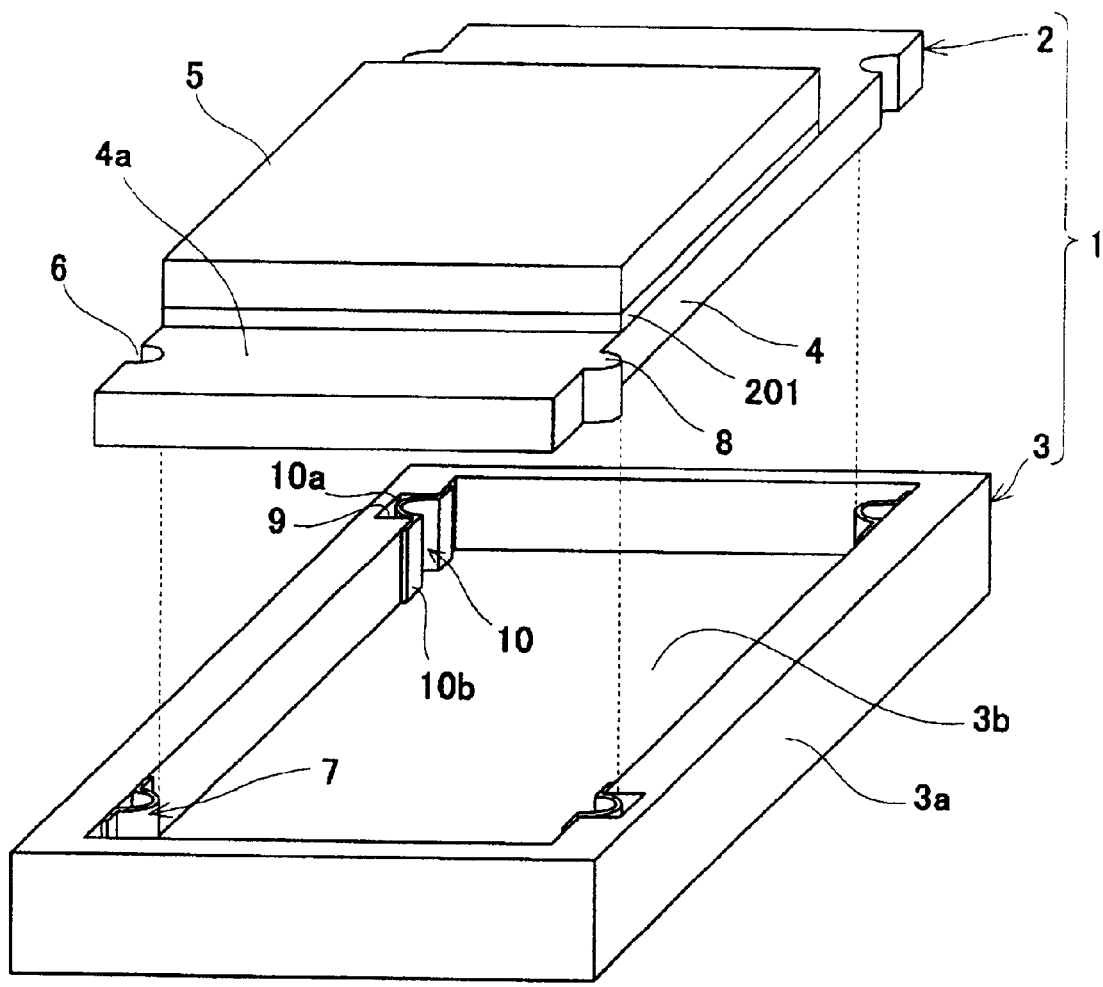
FIG. 18 is an exploded perspective view showing a schematic constitution of a further modification according to the first embodiment.
Figure 19:
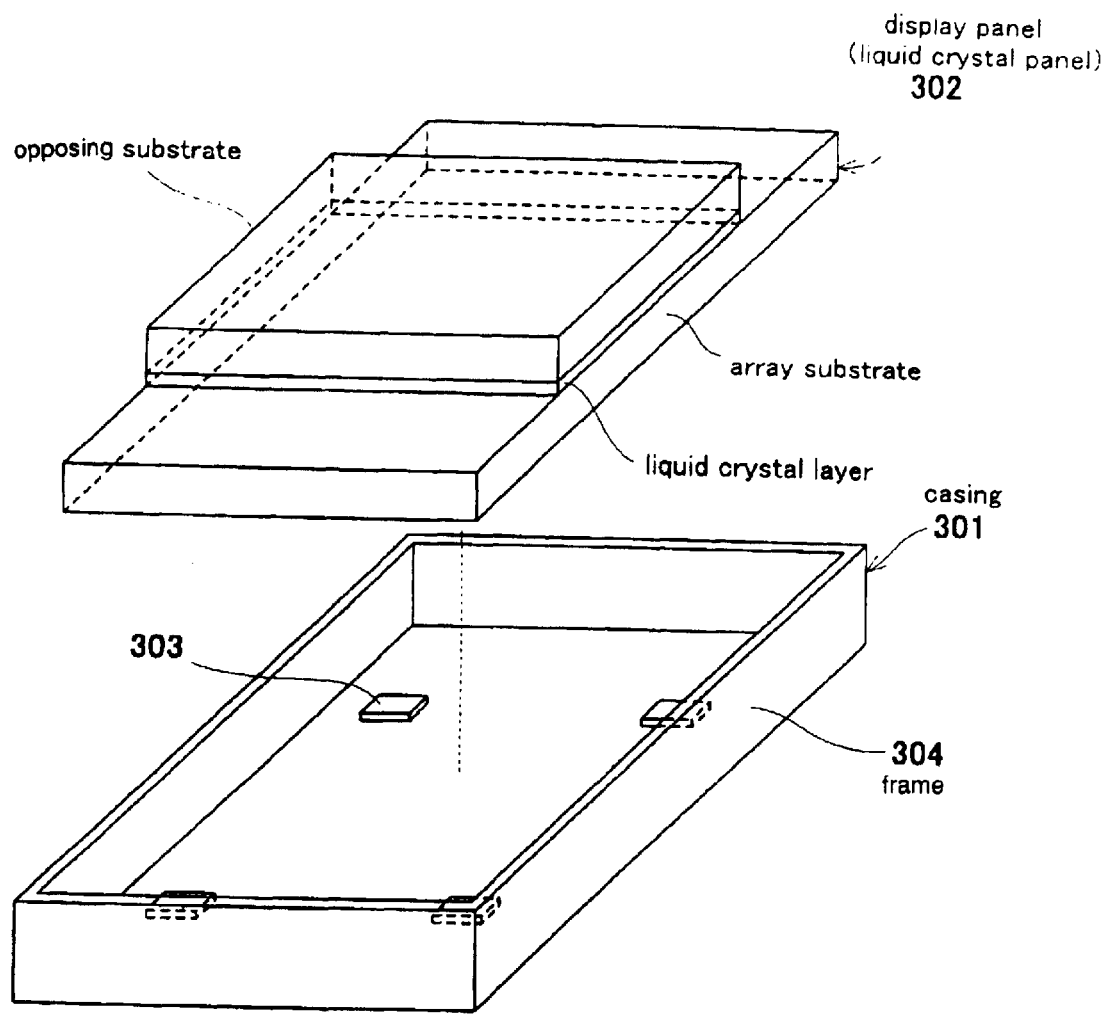
FIG. 19 is an exploded perspective view showing a schematic constitution of the conventional image display.

While the array substrate 4 of FIGS. 1 through 6 is provided with the concave portions 6 and the array substrate 4 of FIGS. 7–11 is provided with the concave portions 8, one array substrate 4 may be provided both of the concave portions 6 and the convex portions 8, as shown in FIG. 18.

Second Embodiment

A second embodiment of the present invention illustrates a case where a display panel is fixed by engagement.

Figure 12:
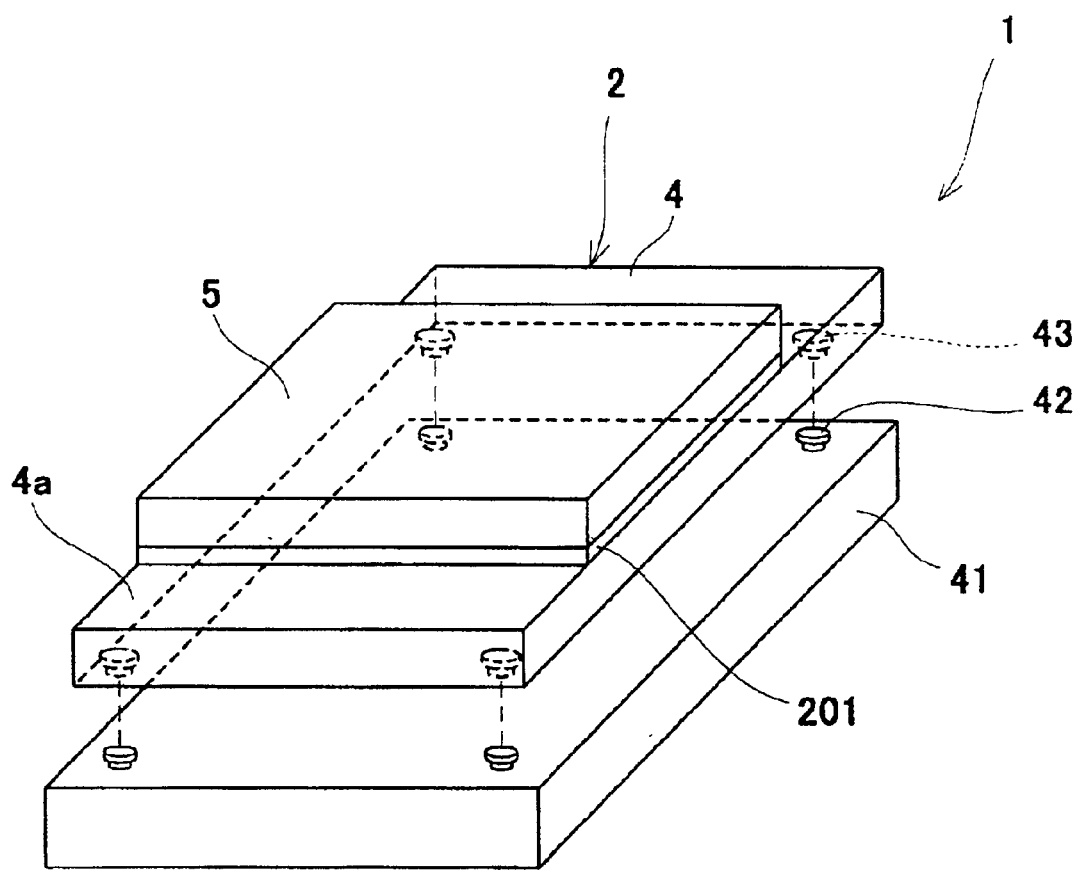
FIG. 12 is an exploded perspective view showing a schematic constitution of an image display according to a second embodiment of the present invention.
Figure 13:
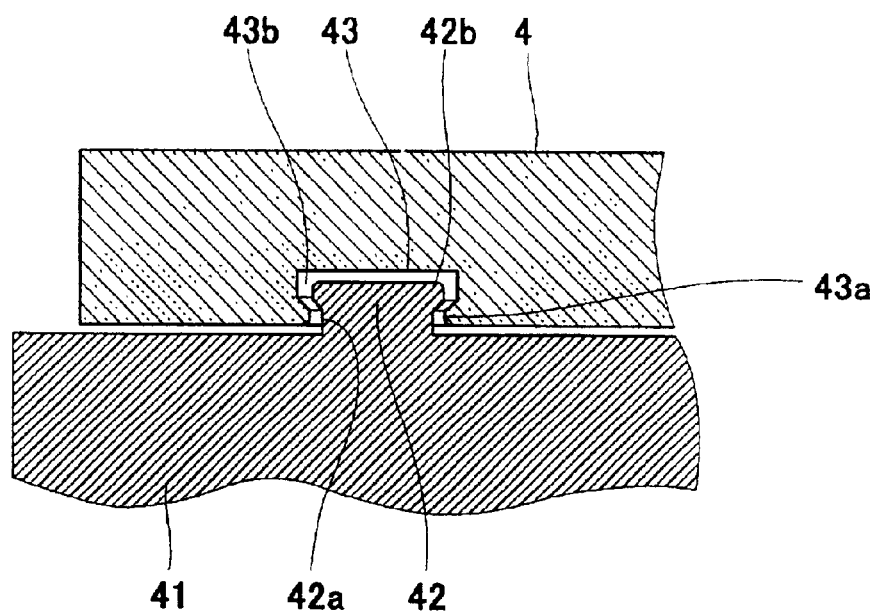
FIG. 13 is a cross-sectional view showing an engagement portion of FIG. 12.

FIG. 12 is an exploded perspective view showing a schematic constitution of an image display of this embodiment. FIG. 13 is a cross-sectional view of an engagement portion of FIG. 12. In FIGS. 12, 13, the same reference numerals of FIG. 1 denote the same or corresponding parts.

Referring to FIG. 12, an image display 1 according to this embodiment is a transparent liquid crystal display, and comprises a light guiding plate (base) 41 for guiding light for display from a light source (not shown) to the display panel 2. The light guiding plate 41 is directly or indirectly fixed to a casing (not shown). The display panel 2 is fixed to the light guiding plate 41 by engagement between them. Therefore, in this embodiment, the light guiding plate 41 serves as a panel fixing member. In other respects, this embodiment is identical to that of the first embodiment.

To be greater detail, there are provided a plurality of (e.g., 4) engagement concave portions 43 on an outer surface (lower surface) of the array substrate 4. The engagement concave portions 43 are provided at regions of the outer surface of the array substrate 4, corresponding to the non-display region 4a. The light guiding plate 41 is made of transparent resin having a predetermined refractive index and substantially rectangular similarly to the array substrate 4. There are provided a plurality of (e.g., 4) engagement convex portions 42 made of an elastic material such as rubber on an upper surface (light emanating surface) of the light guiding plate 41. The engagement convex portions 42 are provided at positions on the upper surface of the light guiding plate 41, corresponding to the engagement concave portions 43 of the array substrate 4.

As shown in FIG. 13, the engagement convex portion 42 of the light guiding plate 41 is stepped-cylindrical as having a small-diameter base portion 42a and a large-diameter tip end portion 42b. The periphery of the tip end face of the engagement convex portion 42 is rounded and the stepped portion has a diameter increasing from the base portion 42a to the tip end portion 42b. In other words, the engagement convex portion 42 is column-shaped such that it extends from the light guiding plate 41 toward the array substrate 4, and has a small cross-sectional area portion (base portion 42a) and a large-cross sectional area portion (tip end portion 42b) along a plane orthogonal to the direction from the light guiding plate 41 toward the array substrate 4 on the side of the light guiding plate 41 and on the side of the array substrate 4, respectively.

On the other hand, the engagement concave portion 43 of the array substrate is substantially similar to the engagement convex portion 42 and slightly larger in size than the same. More specifically, the engagement concave portion 43 is configured such that an entrance portion (lower portion) 43a with small diameter and an opposite portion (upper portion) 43b with large diameter are stepped-cylindrical with diameter increasing from the entrance portion 43a to the upper portion 43b. The periphery of the entrance is rounded. In other words, the engagement concave portion 43 extends from the light guiding plate 41 toward the array substrate 4, and has a small cross-sectional area portion (entrance portion 43a) and a large cross-sectional area portion (upper portion 43b) along the plane orthogonal to the direction from the light guiding plate 41 toward the array substrate 4 on the side of the light guiding plate 41 and on the side of the array substrate 4, respectively.

The tip end portion 42b of the engagement convex portion 42 has a diameter slightly larger than that of the entrance portion 43a of the engagement concave portion 43. The size of the tip end portion 42b of the engagement convex portion 42 and the size of the entrance portion 43a of the engagement concave portion 43 are set in such a manner that at least one of the tip end portion 42b of the engagement convex portion 42 and the entrance portion 43a of the engagement concave portion 43 is elastically deformed so as to be inserted/pulled by a given force when the engagement convex portion 42 is inserted/pulled into/from the engagement concave portion 43.

In the image display 1 so constituted, alignment is first made between the engagement concave portion 43 of the array substrate 4 and the engagement convex portion 42 of the light guiding plate 41, and then the display panel 2 is pressed against the light guiding plate 41, thereby causing the engagement convex portion 42 to be inserted into the engagement concave portion 43, which brings the tip end portion 42b of the engagement convex portion 42 into fitting to the upper portion 43b of the engagement concave portion 43 and the tip end portion 42b into engagement with the entrance portion 43a. As a result, the display panel 2 is fixed to the light guiding plate 41. Simultaneously, the display panel 2 is positioned in the thickness direction and in the direction perpendicular to the thickness direction. In this state, by pulling the display panel 2 by a force exceeding the given force, the engagement convex portion 42 is disengaged from the engagement concave portion 43 and the display panel 2 is detached from the light guiding plate 41.

As should be understood, in accordance with this embodiment, the display panel 2 can be easily positioned in the thickness direction and in the direction perpendicular to the thickness direction and easily fixed to the light guiding plate 41. Besides, the display panel 2 can be removably fixed to the light guiding plate with ease.

Figure 14:
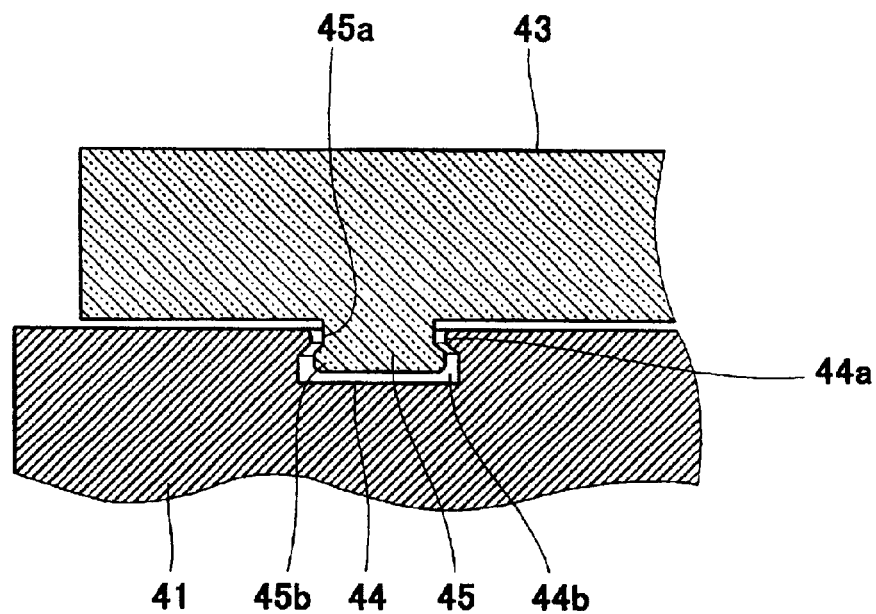
FIG. 14 is a cross-sectional view of an engagement portion of a modification of a second embodiment of the present invention.

Furthermore, in a modification of this embodiment, as shown in FIG. 14, the array substrate 4 may be provided with engagement convex portion 45 and the light guiding plate 41 may be provided with engagement concave portion 44. In that case, an engagement convex portion 45 and an engagement concave portion 44 extend in the directions which are the reverse of the directions in FIG. 13, and in other respects, the constitutions are the same. By pressing the display panel against the light guiding plate 41, the engagement convex portion 45 of the array substrate 4 is inserted into the engagement concave portion 44 of the light guiding plate 41, thereby a tip end portion 45b of the engagement convex portion 45 to be fitted into a lower portion 44b of the engagement concave portion 44, which brings the tip end portion 45b into engagement with an entrance portion 44a of the engagement concave portion 44. As a result, the display panel is fixed to the light guiding plate 41 and positioned in the thickness direction and the direction perpendicular to the thickness direction. With such constitution, the above-mentioned effects are attained.

Nevertheless, it is preferable that the array substrate 4 is provided with the engagement concave portion and the light guiding plate 41 is provided with the engagement convex portion, as shown in FIG. 13, because if the convex portion is provided on the surface of the substrate in molding of the same, this might present an obstacle to handling or the like in subsequent steps.

Further, the cross-section of the engagement convex portions and engagement concave portions may be of any shapes, including a triangle, a rectangle, a polygon, etc, instead of a circle adopted in this embodiment.

Third Embodiment

A third embodiment of the present invention illustrates a case where a display panel is fixed by means of screws.

Figure 15:
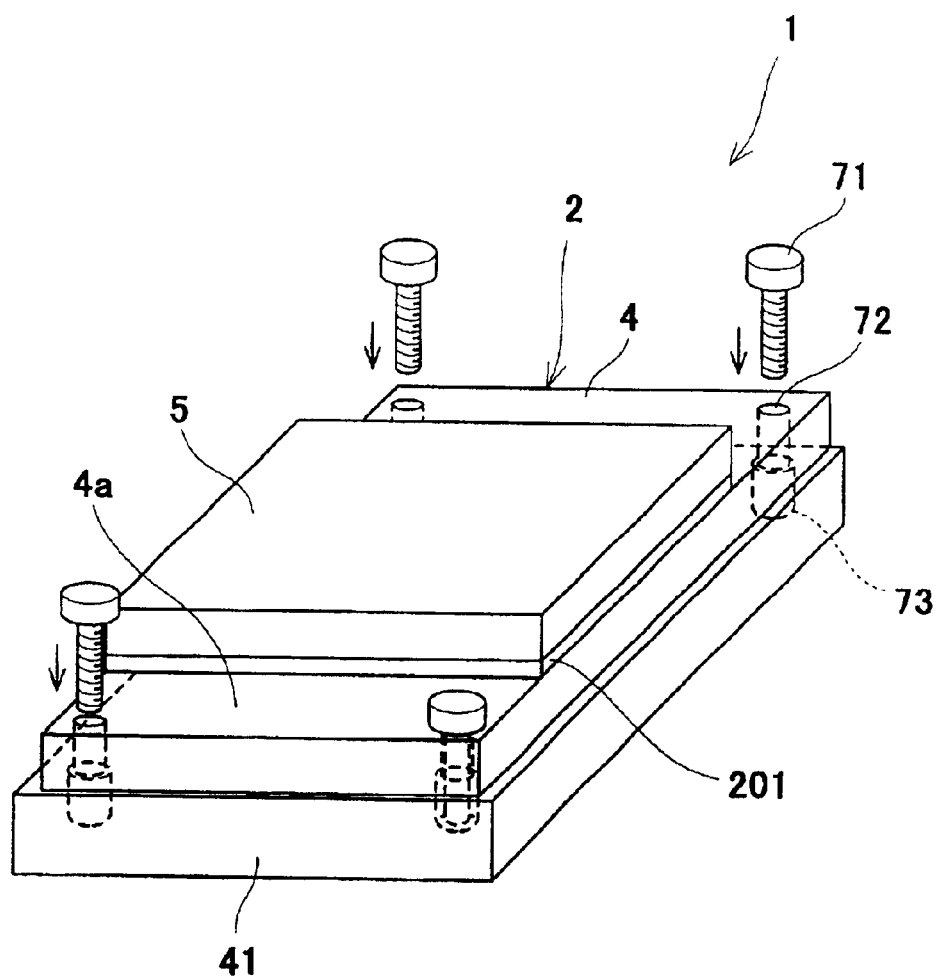
FIG. 15 is an exploded perspective view showing a schematic constitution of an image display according to a third embodiment of the present invention.

FIG. 15 is an exploded perspective view showing a schematic constitution of an image display according to this embodiment. In FIG. 15, the same reference numerals of FIG. 12 denote the same or corresponding parts.

Referring to FIG. 15, there is shown an image display 1 according to this embodiment as having screws 71 for fixing a display panel. A plurality of (four) insertion holes 72 are provided in the non-display region 41 of the array substrate 4 and screw holes 73 are provided in an upper surface of the light guiding plate 41 at positions corresponding to the screw insertion holes 72 of the array substrate 4. The screw insertion holes 72 are formed when individual array substrates 4 are cut out from a large-sized sheet provided with patterns of the plurality of array substrates 4 by using a laser or the like. The other respects are identical to those of the second embodiment. The screw insertion holes 72 are through holes and the screw holes 73 are concave holes, but both of them may be through holes.

The array substrate 4 is placed on the light guiding plate 41 and then the screws 71 are threadedly engaged with the screw holes 73 of the light guiding plate 41 through the screw insertion holes 72, thereby allowing the display panel 2 to be fixed to the light guiding plate 41. Simultaneously, the display panel 2 is positioned in the thickness direction and in the direction perpendicular to the thickness direction. In this state, by disengaging the screws 71, the display panel 2 is detached from the light guiding plate 41.

As should be understood, in accordance with this embodiment, the display panel 2 can be easily positioned in the thickness direction and in the direction perpendicular to the thickness direction and easily fixed to the light guiding plate 41. Besides, the display panel 2 can be removably fixed to the light guiding plate 41 with ease.

Fourth Embodiment

A fourth embodiment of the present invention illustrates a fixing structure of a flexible circuit board.

Figure 16:
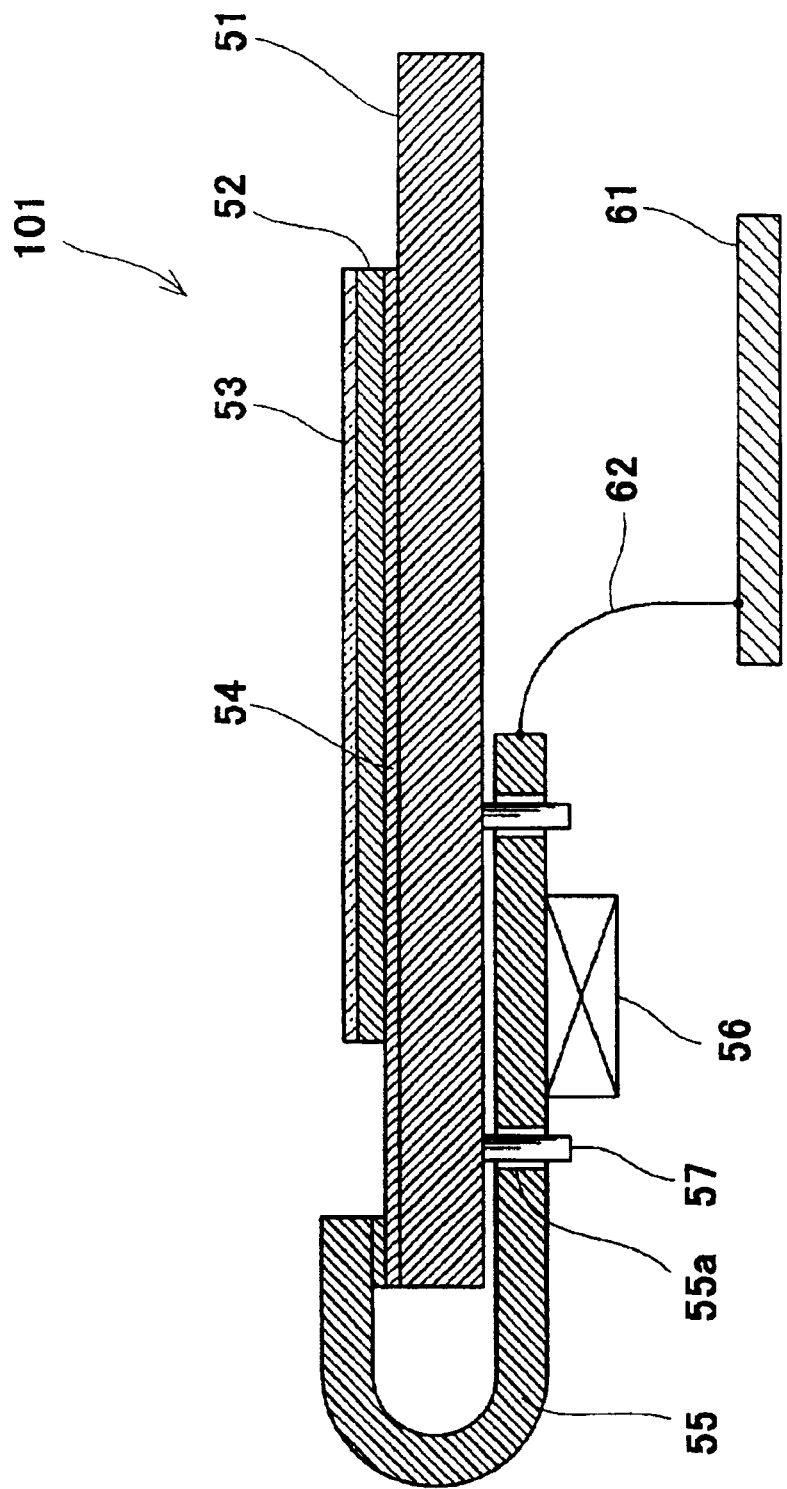
FIG. 16 is a cross-sectional view schematically showing a constitution of main parts of an image display according to a fourth embodiment of the present invention.

FIG. 16 is a cross-sectional view schematically showing a constitution of main parts of an image display according to this embodiment. As shown in FIG. 16, an image display 101 according to this embodiment is an organic EL device. The organic EL device 101 has a plastic substrate 51 as a main part. An organic EL layer 52 is provided on a surface of the plastic substrate 51. The organic EL layer 52 is spaced apart from the plastic substrate 51 by a negative electrode 54 made of, e.g., MgAl alloy. A positive electrode 53 made of, e.g., ITO, is provided on the upper surface of the organic El layer 52. A plurality of (e.g., two) fixing pins 57 are protruded from a rear surface of the plastic substrate 51. The fixing pins 57 are formed when the plastic substrate 51 is formed. A rear surface of one end portion of a flexible circuit board 55 is fixed to one end portion of a front surface of the plastic substrate 51. A drive LSI 56 is mounted on the front surface of the other end side of the flexible circuit board 55, and through holes 55a into which the fixing pins 57 are to be inserted are also formed on the other side. The flexible circuit board 55 is fixed to the plastic substrate 51 by bending the same downwardly and fitting the through holes 55a to the fixing pins 57 of the substrate 51. Thereby, the other end side of the flexible circuit board 55 is placed so as to extend along the rear surface of the plastic substrate 51. The through holes 55a may be replaced by concave portions to which the fixing pins 57 are fitted, and by fittingly inserting the fixing pins 57 into the concave portions, the flexible circuit board 55 may be fixed to the plastic board 51. Alternatively, the fixing pins may be provided on the flexible circuit board 55 and the through holes or the concave portions may be provided on the plastic substrate 51.

The positive electrode 53 and the negative electrode 54 on the plastic substrate 51 are connected to the drive LSI56 through a wiring of the flexible circuit board 55, and the driveLSI56 is connected to a mother board 61 provided at an appropriate position of the image display 101 through a wiring 62. Meanwhile, in the flexible circuit board 55, a first wiring formed on the rear surface thereof is connected to a wiring reaching the positive electrode 53 and the negative electrode 54 and is further connected to a second wiring formed on the front surface thereof though a through hole, which is connected to the drive LSI 56. With this constitution, a drive signal output from the drive LSI in accordance with a video signal input from the mother board 61 drives the organic EL layer 52 to emit light, thus displaying an image. In brief, the organic EL layer 52, the positive electrode 53, and the negative electrode 54 formed on the plastic substrate 51, constitute a display portion, and the plastic substrate 51 constitutes the display panel.

Subsequently, a comparison will be made between the image display 101 and the conventional organic EL display.

Figure 17:
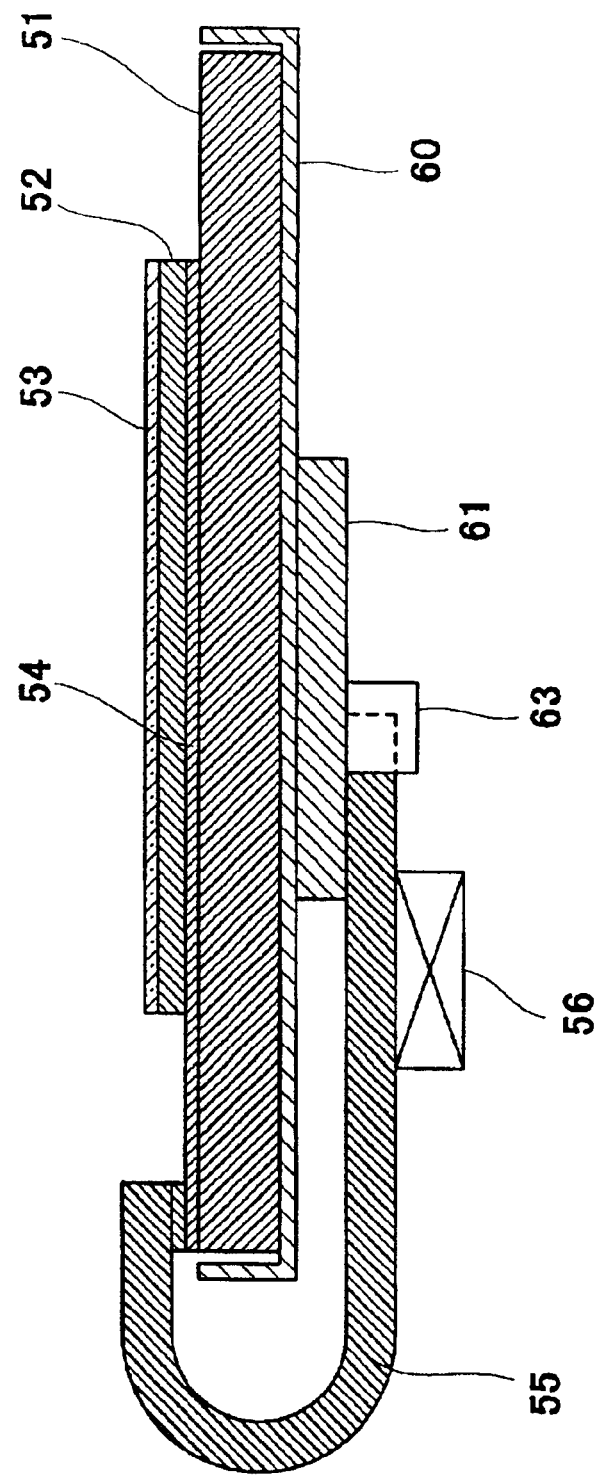
FIG. 17 is a cross-sectional view schematically showing a constitution of main parts of the conventional image display.

FIG. 17 is a cross-sectional view schematically showing a constitution of the conventional organic EL display. As shown in FIG. 17, in the conventional EL display, a plastic substrate 51 is accommodated in a casing 60. A mother board 61 is provided on a lower surface of the casing 60 and a connector 63 is provided on the mother board 61. One end portion of a flexible circuit board 55 is fixed to an end portion of the plastic substrate 51 and the other end thereof is connected to the connector 63. Therefore, in the conventional example, there is a need for members in addition to a display panel, such as the casing 60, for the purpose of fixing one end of the flexible circuit board 55.

On the other hand, in the image display 101 of this embodiment, since both ends of the flexible circuit board 55 are fixed to the plastic substrate 51, the members in addition to the display panel are not needed. Therefore, a compact image display can be achieved. Besides, the flexible circuit board 55 is fixed to the plastic substrate 51 in an easy manner, e.g., by means of the fixing pins 57 and the through holes 55a. The same effects are provided even in the case where the circuit board is not flexible. By way of example, the flexible circuit board 55 of FIG. 16 may be replaced by a rigid circuit board connected to a flexible wiring.

The plastic substrate according to any of the second to fourth embodiments may be glass substrate.

While the description has been given of the present invention applied to the liquid crystal display, the present invention may be applied to other types of flat panel display such as the organic EL device and the plasma display.

While in the fourth embodiment, the present invention is applied to the organic EL device, this may be applied to the flat panel displays such as the liquid crystal display and the plasma display.

While in the second and third embodiments, the engagement portion and the screw insertion holes are provided on the array substrate, they may be provided on the opposing substrate.

While in the first embodiment, the fitting portions are provided on the outer periphery of the substrate and the side portion of the casing, they may be provided on the lower surface of the substrate and the upper surface of the light guiding plate as in the case of the second embodiment. In that case, the fitting concave portions may be cylindrical, and the fitting convex portions may be a rod-shaped and radially compressive by spring elasticity.

While in the second and third embodiments, the substrate is fixed to the light guiding plate, this may be fixed to the casing. Moreover, the substrate may be fixed to any other members directly or indirectly fixed to a body of the image display.

Numerous modifications and alternative embodiments of the invention will be apparent to those skilled in the art in view of the foregoing description. Accordingly, the description is to be construed as illustrative only, and is provided for the purpose of teaching those killed in the art the best mode of carrying out the invention. The details of the structure and/or function maybe varied substantially without departing from the spirit of the invention and all modifications which come within the scope of the appended claims are reserved.

What is claimed is:

1. An image display comprising:
a substrate including a light function layer for displaying an image by emitting or blocking light in accordance with a supplied voltage; and
a base on which the substrate is placed, wherein
a concave portion is provided on a lower surface of the substrate, a convex portion is provided on an upper surface of the base, and the convex portion is fitted to the concave portion, and
wherein the concave portion extends from the base toward the substrate and the convex portion is column-shaped such that it extends from the base toward the substrate,
the concave portion has a small cross-sectional area portion and a large cross-sectional area portion along a plane orthogonal to a direction from the base toward the substrate on the base side and on the substrate side, respectively,
the convex portion has a small cross-sectional area portion and a large cross-sectional area portion along a plane orthogonal to the direction from the base toward the substrate on the base side and on the substrate side, respectively,
the large cross-sectional area portion of the convex portion is fitted to the large cross-sectional area portion of the concave portion and the large cross-sectional area portion of the convex portion is engaged with the small cross-sectional area portion of the concave portion, and
the light function layer is a liquid crystal layer and the base is a light guiding plate for guiding light from a light source toward the liquid crystal layer.

2. An image display comprising:
a substrate including a light function layer for displaying an image by emitting or blocking light in accordance with a supplied voltage; and
a base on which the substrate is placed, wherein
a convex portion is provided on a lower surface of the substrate, a concave portion is provided on an upper surface of the base, and the convex portion is fitted to the concave portion, and
wherein the concave portion extends from the substrate toward the base and the convex portion is column-shaped such that it extends from the substrate toward the base,
the concave portion has a small cross-sectional area portion and a large cross-sectional area portion along a plane orthogonal to a direction from the substrate toward the base on the substrate side and the on the base side, respectively,
the convex portion has a small cross-sectional area portion and a large cross-sectional area portion along a plane orthogonal to a direction from the substrate toward the base, on the substrate side and on the base side, respectively, and
the large cross-sectional area portion of the convex portion is fitted to the large cross-sectional area concave portion and the large cross-sectional area portion of the convex portion is engaged with the small cross-sectional area portion of the concave portion.

3. The image display according to claim 2, wherein the light function layer is made of an inorganic fluorescent material, an organic fluorescent material, or liquid crystal.

4. The image display according to claim 2, wherein the light function layer is a liquid crystal layer and the base is a light guiding plate for guiding light from a light source toward the liquid crystal layer.

5. The image display according to any of claims 1 and 2, wherein the substrate is made of resin.

6. The image display according to any of claims 1 and 2, wherein a plurality of convex portion and a plurality of concave portions are provided.

* * * * *